(12) United States Patent
Okuno et al.

(10) Patent No.: US 10,998,108 B2
(45) Date of Patent: May 4, 2021

(54) ELECTRICAL CONTACT MATERIAL, METHOD OF PRODUCING AN ELECTRICAL CONTACT MATERIAL, AND TERMINAL

(71) Applicants: FURUKAWA ELECTRIC CO., LTD., Tokyo (JP); FURUKAWA AUTOMOTIVE SYSTEMS INC., Shiga (JP)

(72) Inventors: Yoshikazu Okuno, Tokyo (JP); Yoshiaki Kobayashi, Tokyo (JP); Tatsuya Nakatsugawa, Tokyo (JP); Kengo Mitose, Tokyo (JP); Akira Tachibana, Tokyo (JP); Shingo Kawata, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 155 days.

(21) Appl. No.: 15/363,518

(22) Filed: Nov. 29, 2016

(65) Prior Publication Data
US 2017/0076834 A1    Mar. 16, 2017

Related U.S. Application Data

(63) Continuation of application No. PCT/JP2015/065819, filed on Jun. 1, 2015.

(30) Foreign Application Priority Data

May 30, 2014    (JP) .............................. JP2014-112973

(51) Int. Cl.
*H01B 1/02*    (2006.01)
*C25D 5/12*    (2006.01)
(Continued)

(52) U.S. Cl.
CPC ............. *H01B 1/026* (2013.01); *B21D 53/00* (2013.01); *B32B 15/01* (2013.01); *B32B 15/018* (2013.01);
(Continued)

(58) Field of Classification Search
None
See application file for complete search history.

(56) References Cited

U.S. PATENT DOCUMENTS

2010/0089982 A1    4/2010    Sakuyama
2010/0266863 A1    10/2010    Tanaka
(Continued)

FOREIGN PATENT DOCUMENTS

JP    2004-68026 A    3/2004
JP    2009-7668 A    1/2009
(Continued)

OTHER PUBLICATIONS

English machine translation of JP 2011-063875, EPO, accessed Oct. 3, 2018.*
(Continued)

*Primary Examiner* — Xiaobei Wang
(74) *Attorney, Agent, or Firm* — Birch, Stewart, Kolasch & Birch, LLP

(57) ABSTRACT

An electrical contact material (10) having: a conductive substrate (1) formed from copper or a copper alloy; a first intermediate layer (2) provided on the conductive substrate (1); a second intermediate layer (3) provided on the first intermediate layer (2); and an outermost layer (4) formed from tin or a tin alloy and provided on the second intermediate layer (3), wherein the first intermediate layer (2) is constructed as one layer of grains extending from the conductive substrate (1) side to the second intermediate layer (3) side, and wherein, in the first intermediate layer (2),
(Continued)

the density of grain boundaries (5b) extending in a direction in which the angle formed by the grain boundary in interest and the interface between the conductive substrate and the first intermediate layer is 45° or greater, is 4 $\mu m/\mu m^2$ or less; a method of producing the same; and a terminal.

9 Claims, 1 Drawing Sheet

(51) Int. Cl.

| | |
|---|---|
| *H01H 1/025* | (2006.01) |
| *B21D 53/00* | (2006.01) |
| *H01H 1/04* | (2006.01) |
| *C25D 5/50* | (2006.01) |
| *B32B 15/01* | (2006.01) |
| *C22F 1/10* | (2006.01) |
| *C25D 5/34* | (2006.01) |
| *C25D 7/00* | (2006.01) |
| *C22F 1/08* | (2006.01) |
| *C22F 1/16* | (2006.01) |
| *C25D 3/12* | (2006.01) |
| *C25D 3/30* | (2006.01) |
| *C25D 3/38* | (2006.01) |

(52) U.S. Cl.
CPC ............... *C22F 1/08* (2013.01); *C22F 1/10* (2013.01); *C22F 1/16* (2013.01); *C25D 5/12* (2013.01); *C25D 5/50* (2013.01); *C25D 5/505* (2013.01); *C25D 7/00* (2013.01); *H01H 1/025* (2013.01); *H01H 1/04* (2013.01); *C25D 3/12* (2013.01); *C25D 3/30* (2013.01); *C25D 3/38* (2013.01); *C25D 5/34* (2013.01); *Y10T 428/1291* (2015.01); *Y10T 428/12715* (2015.01)

(56) References Cited

U.S. PATENT DOCUMENTS

| | | | |
|---|---|---|---|
| 2010/0304177 A1 | 12/2010 | Yoshida et al. | |
| 2013/0092297 A1 | 4/2013 | Kuwagaki | |
| 2013/0260174 A1* | 10/2013 | Tsuru | H01B 1/026 428/646 |
| 2014/0065440 A1* | 3/2014 | Tsuru | C25D 5/12 428/647 |
| 2017/0044651 A1* | 2/2017 | Tsuru | C22C 9/02 |

FOREIGN PATENT DOCUMENTS

| | | |
|---|---|---|
| JP | 2009-97040 A | 5/2009 |
| JP | 2009-108389 A | 5/2009 |
| JP | 2011-26677 A | 2/2011 |
| JP | 2011-63875 A | 3/2011 |
| JP | 2011-219822 A | 11/2011 |
| JP | 2011-252216 A | 12/2011 |
| JP | 2013-36072 A | 2/2013 |
| WO | WO 2006/134665 A1 | 12/2006 |

OTHER PUBLICATIONS

English machine translation of JP 2011-219822, EPO, accessed Oct. 3, 2018.*
English machine translation of JP 2011-026677, EPO, accessed Oct. 3, 2018.*
Merriam-Webster, "intermetaliic compound", https://www.merriam-webster.com/dictionary/intermetallic%20compound, accessed Oct. 7, 2019.*
International Search Report for PCT/JP2015/065819 dated Jun. 23, 2015.
Written Opinion of the International Searching Authority for PCT/JP2015/065819 (PCT/ISA/237) dated Jun. 23, 2015.
Partial Supplementary European Search Report, dated Jan. 3, 2018, for corresponding European Application No. 15800089.3.

* cited by examiner

ELECTRICAL CONTACT MATERIAL, METHOD OF PRODUCING AN ELECTRICAL CONTACT MATERIAL, AND TERMINAL

CROSS-REFERENCE TO RELATED APPLICATIONS

This application is a Continuation of PCT International Application No. PCT/JP2015/065819 filed on Jun. 1, 2015, which claims priority under 35 U.S.C. § 119 (a) to Japanese Patent Application No. 2014-112973 filed in Japan on May 30, 2014. Each of the above applications is hereby expressly incorporated by reference, in its entirety, into the present application.

TECHNICAL FIELD

The present invention relates to an electrical contact material, a method of producing an electrical contact material, and a terminal.

BACKGROUND ART

Hitherto, in electrical contact materials, copper or a copper alloy having excellent electrical conductivity has been utilized; however, in recent years, enhancement of contact characteristics have progressed, and the number of cases in which copper or a copper alloy is directly used is decreasing. Instead of such a conventional material, materials obtained by subjecting copper or a copper alloy to any of various surface treatments are produced and utilized. Particularly, a member obtained by plating an electric contact portion with Sn or a Sn alloy on the copper or copper alloy, is generally used as an electrical contact material.

This plated material is known as a high-performance conductor having: excellent electrical conductivity and physical strength of the conductive substrate; and excellent electrical connectivity, corrosion resistance and solderability of the plating layer. Thus, the plated material is widely used in various terminals, connectors and the like, which are used in electric or electronic equipment. This plated material usually has a first plated (under coated) with nickel (Ni), cobalt (Co) or the like having a barrier function on the substrate, in order to prevent diffusion of the alloy components in the conductive substrate of copper (Cu) or the like into the aforementioned plating layer.

In a case where this plated material is used as a terminal, for example, in a high-temperature environment, such as inside an automotive engine room, since Sn in the Sn-plating layer on the terminal surface is readily oxidizable, an oxide film is formed on the surface of the Sn-plating layer. Since this oxide film is brittle, the oxide film is broken at the time of terminal connection, and the unoxidized Sn-plating layer underneath the oxide film is exposed, so that satisfactory electrical connectivity is obtained.

However, regarding the use environment for electrical contact materials in recent years, the electrical contact materials are more often used in high-temperature environments. For example, for a contact material for a sensor used in an automotive engine room or the like, there is an increasing possibility that the contact material may be used in a high-temperature environment at 100° C. to 200° C. or the like. Thus, such an electrical contact material is required to have reliability in the contact characteristics at a temperature higher than the temperature for use that is assumed to be conventional consumer products. Particularly, regarding the cause that controls the reliability of contact characteristics, there is a problem that under high-temperature conditions, the contact resistance at the outermost layer is increased as a result of diffusion of conductive substrate components and surface oxidation. Thus, various investigations have been made on the suppression of diffusion of these conductive substrate components and the prevention of oxidation.

Patent Literature 1 proposes a conductive material for a Sn-plated connection component having excellent heat resistance, the conductive material having a Cu—Sn alloy layer and a Ni layer formed between the outermost layer Sn plating and the conductive substrate surface, in this order from the outermost layer. Patent Literature 2 proposes a configuration having a Sn layer, a Cu—Sn alloy layer, and a Ni or Cu layer formed on a conductive substrate in this order from the outermost surface, in which the average grain size in the Cu—Sn layer is made large, and thus abrasion resistance of tin plating is improved. Further, Patent Literature 3 proposes a configuration having a Cu—Sn alloy layer and a Ni layer formed on a conductive substrate in this order from the outermost surface, in which the Cu concentration in the Cu—Sn layer is gradually decreased from the base side toward the surface side, and thereby a fretting phenomenon in the outermost layer is suppressed.

CITATION LIST

Patent Literatures

Patent Literature 1: JP-A-2004-068026 ("JP-A" means unexamined published Japanese patent application)
Patent Literature 2: JP-A-2009-097040
Patent Literature 3: JP-A-2009-007668

SUMMARY OF INVENTION

Technical Problem

However, the above conventional technologies do not provide sufficient measures to cope with the heightened requirement for high-temperature durability in recent years. That is, when a high-temperature environment is adopted, Cu in the matrix diffuses through a Ni layer and a Cu—Sn alloy layer to reach a Sn layer, and reacts with the Sn layer, so that the Sn layer is diminished. Also, there is a problem that when the Sn layer disappears, Cu at the outermost layer is exposed and forms copper oxide, which results in an increase in contact resistance.

The present invention was achieved in view of the above conventional problems. The present invention is contemplated for providing, by controlling grain boundaries of a first intermediate layer formed from nickel, cobalt, an alloy thereof or the like, an electrical contact material, in which diffusion of the material of the conductive substrate into the outermost layer is suppressed even in a high-temperature use environment, and in which the increase in contact resistance is suppressed.

Solution to Problem

That is, the present invention provides the following means:
(1) An electrical contact material having: a conductive substrate formed from copper or a copper alloy; a first intermediate layer provided on the conductive substrate; a second intermediate layer provided on the first intermediate layer; and an outermost layer formed from tin or a tin alloy and provided on the second intermediate layer, wherein the first intermediate layer is constructed as one layer of grains extending from the conductive substrate side to the second intermediate layer side, and wherein, in the first intermediate layer, the density of grain boundaries extending in a direction in which the angle formed by the grain boundary in interest and the interface between the conductive substrate and the first intermediate layer is 45° or greater, is 4 µm/µm$^2$ or less.

(2) The electrical contact material according to (1), wherein the first intermediate layer is formed from any of nickel, a nickel alloy, cobalt, or a cobalt alloy.

(3) The electrical contact material according to (1) or (2), wherein the second intermediate layer is formed from copper or a copper alloy.

(4) A method of producing the electrical contact material according to any one of (1) to (3), comprising:

plating the first intermediate layer on the conductive substrate at a current density of 10 A/dm$^2$ or higher;

plating the second intermediate layer on the first intermediate layer; and plating the outermost layer on the second intermediate layer; followed by subjecting the resultant electrical contact material to a heat treatment at 100° C. to 700° C. for 30 minutes to 7 seconds.

(5) A method of producing the electrical contact material according to any one of (1) to (3), comprising:

plating the first intermediate layer on the conductive substrate at a current density of 5 A/dm$^2$ or higher;

plating the second intermediate layer on the first intermediate layer; and plating the outermost layer on the second intermediate layer, followed by performing area reduction working from above the outermost layer, and subjecting the resultant electrical contact material to a heat treatment at 100° C. to 700° C. for 30 minutes to 7 seconds.

(6) A method of producing the electrical contact material according to any one of (1) to (3), comprising:

plating the first intermediate layer on the conductive substrate at a current density of 5 A/dm$^2$ or higher, followed by performing area reduction working from above the first intermediate layer;

plating the second intermediate layer on the first intermediate layer; and plating the outermost layer on the second intermediate layer, followed by subjecting the resultant electrical contact material to a heat treatment at 100° C. to 700° C. for 30 minutes to 7 seconds.

(7) A method of producing the electrical contact material according to any one of (1) to (3), comprising:

plating the first intermediate layer on the conductive substrate at a current density of 5 A/dm$^2$ or higher;

plating the second intermediate layer on the first intermediate layer, followed by performing area reduction working from above the second intermediate layer; and plating the outermost layer on the second intermediate layer, followed by subjecting the resultant electrical contact material to a heat treatment at 100° C. to 700° C. for 30 minutes to 7 seconds.

(8) The method of producing the electrical contact material according to any one of (5) to (7), wherein the working ratio for the area reduction working is 30% to 70%.

(9) A terminal formed from the electrical contact material according to any one of (1) to (3).

Other and further features and advantages of the invention will appear more fully from the following description, appropriately referring to the accompanying drawings.

Advantageous Effects of Invention

The electrical contact material of the present invention can suppress diffusion of the material of the conductive substrate into the outermost layer even in a high-temperature use environment, and can suppress the increase in contact resistance.

MODE FOR CARRYING OUT THE INVENTION

The electrical contact material of the present invention has, on a conductive substrate formed from copper or a copper alloy, a first intermediate layer, a second intermediate layer, and an outermost layer formed from tin or a tin alloy. Further, the first intermediate layer is constructed as one layer of grains extending from the conductive substrate side to the second intermediate layer side. In regard to the first intermediate layer, when the density of the grain boundaries extending such that the angle formed by the grain boundary in interest and the interface between the conductive substrate surface and the first intermediate layer is 45° or greater, is adjusted to 4 µm/µm$^2$ or less, diffusion of Cu of the conductive substrate into the Sn or Sn alloy layer at the outermost layer is suppressed.

In the first intermediate layer, such as a Ni layer, Cu predominantly undergoes grain boundary diffusion rather than transgranular diffusion. This is assumed that because, particularly, the contribution of diffusion at the grain boundaries where the angle formed by the grain boundary in interest and the conductive substrate is 45° or greater, is larger as compared to the contribution of diffusion at the grain boundaries where the same angle is less than 45°.

For that reason, when the grain boundaries where this angle is 45° or greater are reduced, diffusion of Cu from the conductive substrate and exposure of the Cu at the outermost layer, such as a Sn layer, to form copper oxide, are suppressed. Thus, even in a high-temperature use environment, the increase in contact resistance can be suppressed.

Further, in regard to the electrical contact material of the present invention, the terminology "the first intermediate layer is constructed as one layer of grains extending from the conductive substrate side to the second intermediate layer side" means that the interface of the grain boundaries of the grains constituting the first intermediate layer has come out from the interface between the conductive substrate and the first intermediate layer, such as a Ni layer, to the interface between the first intermediate layer, such as a Ni layer, and the second intermediate layer of Cu. The first intermediate layer is a single layer configured such that grains are horizontally lined up, and grain boundaries penetrate through the first intermediate layer.

Figure 1:
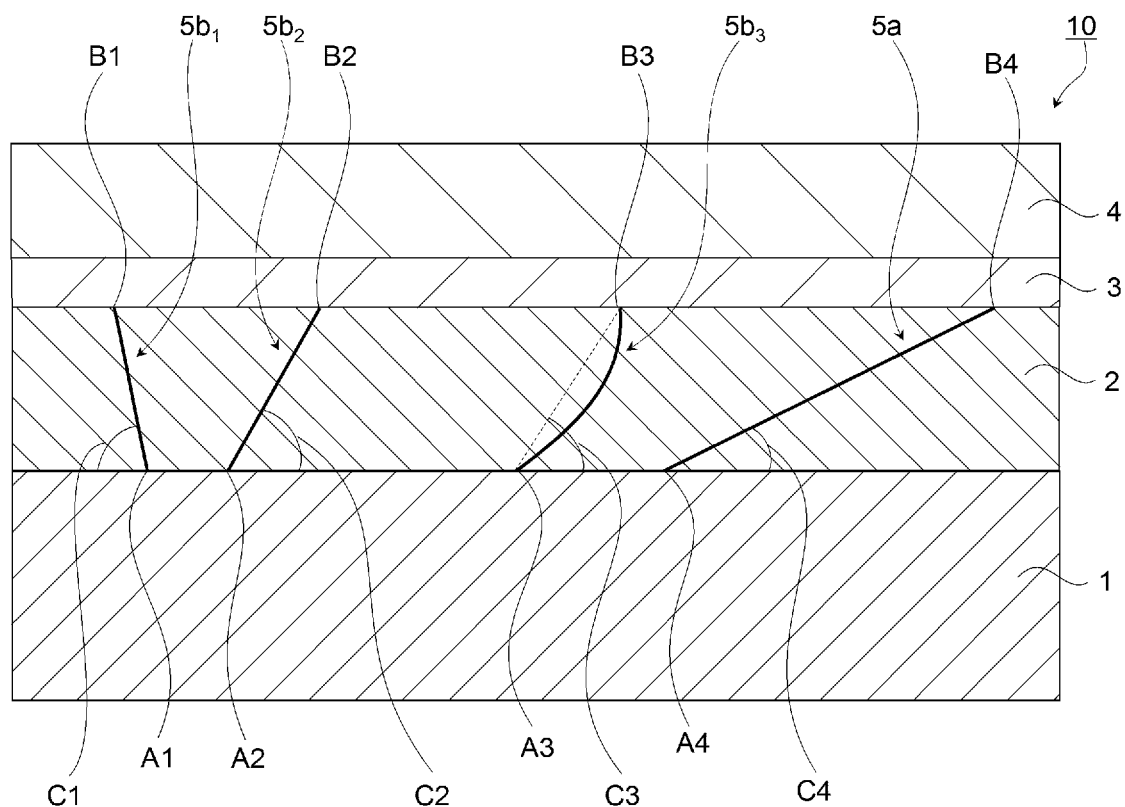
FIG. 1 is a cross-sectional view diagram of the electrical contact material of the present invention, schematically illustrating the state of the grain boundaries in the first intermediate layer.

This will be explained with reference to FIG. 1.

In the diagram, the electrical contact material 10 is configured such that on a conductive substrate 1 formed from copper or a copper alloy, a first intermediate layer 2 of Ni or the like, a second intermediate layer 3 of copper or the like, and an outermost layer 4 formed from tin or a tin alloy are provided in this order. The first intermediate layer 2 is configured as one layer of grains extending from the conductive substrate 1 side to the second intermediate layer 3 side. As in the above, there are two possible cases concerning grain boundaries 5a and 5b of grains 6 that constitute the first intermediate layer 2: a case in which the angle formed by the grain boundary in interest and the interface between the conductive substrate 1 and the first intermediate layer 2 is less than 45° (5a); and a case in which the same angle is 45° or greater ($5b_1$, $5b_2$, and $5b_3$). According to the present invention, the value ($\mu m/\mu m^2$) obtained by dividing the length of grain boundaries ($5b_1$, $5b_2$ and $5b_3$) with which the angle thus formed is 45° or greater, by the viewing field area, is 4 $\mu m/\mu m^2$ or less. In the following description, this is also referred to as the grain boundary of the first intermediate layer (2). It is a feature of the present invention to reduce the amount of grain boundaries that are in such a state of grain boundaries (state of grain boundaries penetrating through the first intermediate layer) and have a gradient of 45° or greater. Thereby, diffusion of the substrate components to the outermost layer along these grain boundaries can be suppressed. Meanwhile, since the form of the grain boundaries in the diagram is a conceptual diagram, the grain boundaries are representatively illustrated in the form of straight lines; however, grain boundaries cannot be said to be necessarily straight lines extending from the conductive substrate 1 side to the second intermediate layer 3 side.

Preferred embodiments of the electrical contact material of the present invention and the method of producing the same will be explained.

(Electrical Contact Material)

<Conductive Substrate>

The conductive substrate that can be used in the present invention is formed from copper or a copper alloy. For example, as examples of the copper alloy, use can be made of: "C14410 (Cu-0.15Sn, manufactured by Furukawa Electric Co., Ltd., trade name: EFTEC-3)", "C19400 (Cu—Fe-based alloy material, Cu-2.3Fe-0.03P-0.15Zn)", "C18045 (Cu-0.3Cr-0.25Sn-0.5Zn, manufactured by Furukawa Electric Co., Ltd., trade name: EFTEC-64 T)", "C64770 (Cu—Ni—Si-based alloy material, manufactured by Furukawa Electric Co., Ltd., trade name: FAS-680)", and "C64775 (Cu—Ni—Si-based alloy material, manufactured by Furukawa Electric Co., Ltd., trade name: FAS-820)", each of which is an alloy published by CDA (Copper Development Association). (Meanwhile, the numerical units described before the respective elements in the copper alloys represent percentage by mass (mass %) in the copper alloys.) Further, use can also be made of: TPC (tough pitch copper), OFC (oxygen-free copper), phosphor bronze, brass (for example, 70 mass % Cu-30 mass % Zn, abbreviated to 7/3 bronze), and the like. Since these conductive substrates respectively have different electrical conductivities and physical strengths, the conductive substrate is appropriately selected and used according to the required characteristics. However, from the viewpoint of enhancing electrical conductive property and heat dissipation property, it is preferable to use a strip of a copper alloy having an electrical conductivity of 5% IACS or higher. Meanwhile, the "substrate component" according to the present invention on the occasion of handling the copper alloy as the conductive substrate is meant to represent copper, which is a base metal. The thickness of the conductive substrate is not particularly limited, but the thickness is usually 0.05 to 2.00 mm, and preferably 0.1 to 1.2 mm.

<First Intermediate Layer>

The metal that constitutes the first intermediate layer in the present invention is not particularly limited, as long as the metal can prevent diffusion of the conductive substrate components when formed into a predetermined thickness, and can impart heat resistance. It is preferable that the first intermediate layer is formed from any one of nickel, a nickel alloy, cobalt, and a cobalt alloy, all of which are inexpensive and is readily applicable by coating.

The first intermediate layer in the present invention is constructed as one layer of grains extending from the conductive substrate side to the second intermediate layer side. The interfaces of the grain boundaries come out from the "interface between the conductive substrate and the first intermediate layer (Ni layer or the like)" to the "interface between the first intermediate layer (Ni layer or the like) and the second intermediate layer of Cu or the like". That is, the first intermediate layer is a single layer of grains, and grain boundaries penetrate therethrough. Further, the grain boundaries of the first intermediate layer are such that the density of grain boundaries extending in a direction of 45° or larger at an angle formed by the grain boundary in interest and the interface between the conductive substrate and the first intermediate layer, is 4 $\mu m/\mu m^2$ or less. The density of grain boundaries extending in the direction of 45° or larger at an angle formed by the grain boundary in interest and the interface between the conductive substrate and the first intermediate layer, as schematically illustrated in FIG. 1, is as small as 4 $\mu m/\mu m^2$ or less.

In regard to the density of the grain boundaries of this first intermediate layer, it is effective that the density of grain boundaries extending in the direction of 45° or larger at an angle formed by the grain boundary in interest and the interface between the conductive substrate and the first intermediate layer, is 4 $\mu m/\mu m^2$ or less. The density is more preferably 3 $\mu m/\mu m^2$ or less, and further preferably 2 $\mu m/\mu m^2$ or less. The lower limit value is not limited and is usually 0.5 $\mu m/\mu m^2$ or more. In an electrical contact material in which a first intermediate layer having such grain boundaries is provided, diffusion of the conductive substrate components to the outermost layer can be suppressed.

The thickness of the first intermediate layer is preferably 0.05 to 2 $\mu m$, and more preferably 0.2 to 1 $\mu m$. This first intermediate layer may also be formed in a usual manner, such as a sputtering method, a vapor deposition method, or a wet plating method. When the ease of control of the grain boundaries or thickness and the productivity are considered, it is particularly preferable to utilize a wet plating method, and it is further preferable to utilize an electroplating method.

The product of the present invention can suppress diffusion of the conductive substrate components into the outermost layer, and has satisfactory heat resistance, as compared to conventional products (the case where regarding the grain boundaries of the first intermediate layer, the density of the grain boundaries extending in a direction of 45° or larger with respect to the interface between the conductive substrate and the first intermediate layer, is 4 $\mu m/\mu m^2$ or more).

<Second Intermediate Layer>

The second intermediate layer in the present invention is preferably formed from copper or a copper alloy. The second intermediate layer is more preferably a copper strike-plating layer. The thickness of the second intermediate layer is preferably 0.05 to 2 µm, and more preferably 0.1 to 1 µm. The second intermediate layer can be formed in a usual manner, such as a sputtering method, a vapor deposition method, or a wet plating method. When the ease of control of coating thickness and the productivity are considered, it is particularly preferable to utilize a wet plating method, and it is further preferable to utilize an electroplating method.

<Outermost Layer>

The outermost layer of the electrical contact material of the present invention is formed from tin or a tin alloy. Since this outermost layer has low contact resistance, the outermost layer has satisfactory connection reliability and satisfactory productivity. The thickness of the outermost layer is preferably 0.05 to 5 µm, and more preferably 0.2 to 3 µm. The outermost layer can be formed in a usual manner, such as a sputtering method, a vapor deposition method, or a wet plating method. When the ease of control of coating thickness and the productivity are considered, it is particularly preferable to utilize a wet plating method, and it is further preferable to utilize an electroplating method.

(Method of Producing Electrical Contact Material)

<Control of Grain Boundaries in First Intermediate Layer 1>

The inventors of the present invention have found that the grain boundaries of the first intermediate layer can be achieved by employing a high-current density at the time of plating the first intermediate layer. When plating is performed using a large current with a current density of 10 A/dm$^2$ or higher at the time of electroplating the first intermediate layer, desired grain boundaries of the first intermediate layer are obtained. The current density is more preferably 15 A/dm$^2$ or higher, and further preferably 25 A/dm$^2$ or higher. On the other hand, in regard to the upper limit of the current density, it is necessary to prevent the surface unevenness after plating from becoming conspicuously noticeable, and it is preferable to set the current density to 40 A/dm$^2$ or less. At the final step of the process, a heat treatment such as described below is applied to.

According to this method, the area reduction working as described below is not needed.

<Control of Grain Boundaries in First Intermediate Layer 2>

The electroplating current density of the first intermediate layer is set to be 5 A/dm$^2$ or higher. In this case, desired grain boundaries of the first intermediate layer can be obtained by performing area reduction working that will be described below. The current density is more preferably 10 A/dm$^2$ or more, and further preferably 20 A/dm$^2$ or more. On the other hand, the upper limit of the current density is preferably set to be 40 A/dm$^2$ or less, since it is necessary to prevent the surface unevenness after plating from becoming conspicuously noticeable.

The timing for performing the area reduction working can be selected from among a case of from above the outermost layer after plating the outermost layer, a case of from above the first intermediate layer after plating the first intermediate layer, and a case of from above the second intermediate layer after plating the second intermediate layer. In any case, a heat treatment such as described below is applied to at the end of the process.

In the present invention, as one measure for achieving this state of grain boundaries of the first intermediate layer, for example, the state can be achieved by performing a heat treatment after forming the first intermediate layer, the second intermediate layer, and the surface layer (i.e. the outermost layer). The heat treatment needs to be carried out to the extent that diffusion of the conductive substrate does not proceed. In order to do so, the heat treatment is carried out, for example, at a temperature of 100° C. to 700° C., for 30 minutes to 7 seconds. If the temperature of this heat treatment is too high, or the heating time is too long, the thermal history becomes excessive, diffusion of the conductive substrate components proceeds, and there is a possibility that connection reliability may be deteriorated.

According to the present invention, when the area reduction working is performed, recrystallization-driving force can be introduced into the first intermediate layer, and the first intermediate layer can be made to go through recrystallization readily. It is preferable that the area reduction working in this case is performed by plastic working, such as cold rolling or press working (herein, cold rolling and press working will be together simply described as, for example, area reduction working).

In this case, the rolling-working ratio (or cross-sectional area reduction ratio) at the time of plastic working, such as area reduction working, is preferably set to 30% to 70%. As the rolling-working ratio is higher, plastic working is applied to a larger extent. Thus, the defect energy caused by plastic deformation can be accumulated. Accordingly, when this is released, recrystallization is accelerated. Meanwhile, if the working ratio for the area reduction working and the like exceeds 70%, rupture (breaking) or cracking readily occurs at the time of working, and the energy load (electric power needed for rolling or pressing) also increases. Thus, it is preferable that the working ratio is 70% or lower.

The terms "rolling-working ratio" as defined in the present invention means to represent the ratio (%) represented by: "{(sheet thickness before working)−(sheet thickness after working)}×100/(sheet thickness before working)".

Further, in the case of performing the area reduction working, for example, in the case of rolling, the rolling process may be repeated any of the number of times. However, if the number of times of rolling is increased, the productivity is deteriorated, and thus, it is preferable that the number of times of rolling is lower. Also, in regard to the rolling machine, for example, rolling is performed using a cold-rolling machine. Examples of the rolling machine usually include: a 2-roll machine, a 4-roll machine, a 6-roll machine, a 12-roll machine, and a 20-roll machine, and any of the rolling machines can be used.

Regarding the rolling roll that can be used for the rolling, when it is considered that if the surface unevenness at a noble metal-coated member surface formed by transfer of rolling lines is large, bending workability or the abrasion resistance on the occasion in which the member is used as a sliding contact is deteriorated, the arithmetic mean (Ra) of the work roll surface roughness is preferably less than 0.20 µm, and more preferably less than 0.08 µm. Herein, cold rolling has been explained as a representative example of plastic working; however, in the case of press working (for example, coining), plastic working can be applied similarly to the case of cold rolling. In the case of a press working method, plastic working can be achieved by adjusting the working ratio through adjustment of the pressure to a press pressure of 0.1 N/mm$^2$ or more, and thereby applying plastic deformation.

As described above, in a case where plating of various layers is performed, the above-described heat treatment is applied to after the area reduction working is completed.

As discussed above, when the production methods of the control of grain boundaries of the first intermediate layer 1 or 2 is utilized, the grain boundaries of the first intermediate layer after plating can be controlled. As a result, since the grain boundaries of the first intermediate layer can be controlled, and the conductive substrate components do not diffuse into the outermost layer, an electrical contact material having excellent heat resistance and high-connection reliability for an extended period of time can be provided.
(Use of Electrical Contact Material)

The electrical contact material obtained in the present invention has particularly excellent heat resistance, and as a result, surface layer contamination after the passage of thermal history in the various production steps occurs to a reduced extent, and the electrical contact material has excellent long-term reliability. Thus, the electrical contact material is preferably suitable for electrical contact components, such as a terminal, a connector, and a lead frame.

Examples

The present invention will be described in more detail based on examples given below, but the invention is not meant to be limited by these.

Each of the conductive substrates indicated in Table 1, having a thickness of 0.25 mm and a width of 50 mm, was subjected to preliminary treatments as described below (electrolytic degreasing and acid washing steps). Then, a Ni first intermediate layer, a Cu second intermediate layer, and a Sn outermost layer as indicated in Table 1 were provided under the conditions described below, and thereby the electrical contact materials of Examples and Comparative Examples indicated in Table 1 were obtained.

In Table 1, FAS680 and 7/3 bronze are as described above. MSP1 is C18665 (Cu—Mg—P-based alloy material, manufactured by Mitsubishi Shindoh Co., Ltd., trade name: MSP1).

Meanwhile, in an example in which a rolling was performed, after the Ni first intermediate layer was formed, or after the Cu second intermediate layer was formed, or after the Sn outermost layer was formed, cold rolling (using a six-stage rolling machine, manufactured by Hitachi, Ltd., arithmetic mean roughness Ra of working roll≈0.03 µm) was carried out at the rolling-working ratio described in Table 1. The number of times of rolling was set to one time, and rolling was performed after the initial sheet thickness was adjusted such that the sheet thickness after rolling would be 0.25 mm.

Further, regarding the coating thickness of the first intermediate layer, the second intermediate layer, or the outermost layer, the sample was prepared by forming the initial coating thickness to be thick in consideration of the portion adjusted according to the working ratio. Thus, the coating thicknesses described in Table 1 represent the coating thicknesses (expressed in µm) after rolling.

Regarding the heat treatment, the treatment was performed using a tubular furnace in a nitrogen atmosphere, at the heat treatment temperature and time described in Table 1.

In regard to the thickness (coating thickness) of each layer, measurement was made at any arbitrary 10 sites at any viewing field, using a fluorescent X-ray film thickness analyzer (SFT-9400, trade name, manufactured by Seiko Instruments, Inc.), and using a collimator diameter of 0.5 mm, and the average value of the measurement values was calculated. This was designated as the coating thickness, in the respective layer.

Further, in order to determine the grain boundaries of the first intermediate layer, a cross-sectional sample was produced to give nine viewing fields by sectioning the sample at a pitch of about 10° from a direction perpendicular to the rolling direction to a horizontal direction by a FIB method (Focused Ion Beam method), and SIM image (Scanning Ion Microscope) observation was carried out. A cross-section was cut such that the depth of each of the cross-sectional samples would be to the total thickness of the first intermediate layer, and the length would be a length of 12 µm or more as viewed from a viewing field on the substrate, and observation was made on 10 µm within the length. A cross-sectional sample at a position within ±1 mm from the center in the width direction of the conductive substrate was produced. This was done so as to avoid those sites at the end portions in the width direction, at which working deformation, such as slits and cuts, had been introduced.

Figure 2:
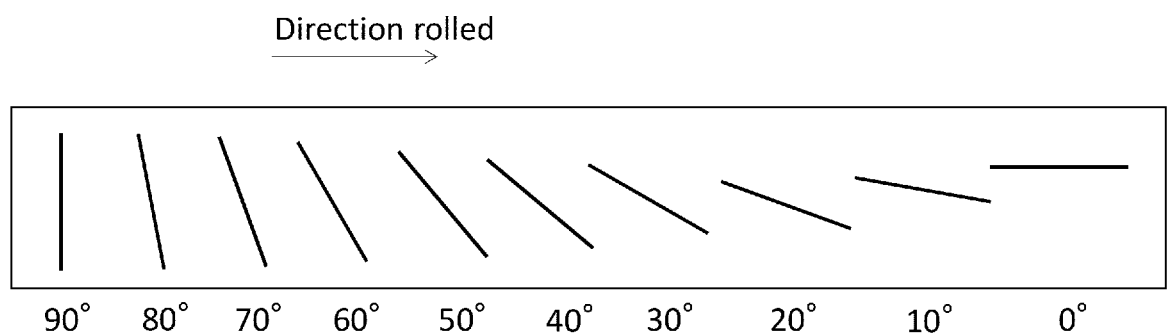
FIG. 2 is a diagram schematically illustrating a method of sectioning a sample at a pitch of about 10° when the state of the grain boundaries in the first intermediate layer is analyzed.

Herein, sectioning at a pitch of about 10° was done as schematically illustrated in FIG. 2. FIG. 2 shows the observations made on the laminated surface of layers on the substrate from above. This means that nine cross-sections were observed at 0° (horizontal), 10°, 20°, 30°, 40°, 50°, 60°, 70°, 80°, and 90° (vertical) from a direction parallel to the rolling direction.

In regard to the grain boundaries of the first intermediate layer ($5a$, $5b_1$, $5b_2$, and $5b_3$ in FIG. 1), the intersection points with respect to the interface between the first intermediate layer and the substrate (A1, A2, A3, and A4 in FIG. 1); and in regard to the same grain boundaries as mentioned above ($5a$, $5b_1$, $5b_2$, and $5b_3$ in FIG. 1), the intersection points with respect to the interface between the first intermediate layer and the second intermediate layer (B1, B2, B3, and B4 in FIG. 1), were connected with straight lines, and the angles formed by the interface between the first intermediate layer and the substrate interface, and the aforementioned straight lines (C1, C2, C3, and C4 in FIG. 1) were measured. Among the angles, smaller ones were employed. That is, acute angles (90° or less) were employed, instead of obtuse angles (more than 90°). It was determined whether the angle was: less than 45° ($5a$ (C4) in FIG. 1); or 45° or more ($5b_1$ (C1), $5b_2$ (C2), and $5b_3$ (C3) in FIG. 1). Further, the lengths of the above-mentioned straight lines (the lengths of A1B1, A2B2, A3B3, and A4B4 in FIG. 1) were defined as the lengths of the respective grain boundaries. In a case where the grain boundary is a straight line (A1B1, A2B2, or A4B4), the length was the length of the straight line; and in a case where the grain boundary is a curved line (A3B3), it was the distance from the intersection point A3 to the intersection point B3 (the length connected by a straight line).

The sum total of the lengths of all the grain boundaries having an angle of 45° or more was divided by the area of the viewing field observed (total thickness of the first intermediate layer 0.5 µm×viewing field observed 10 µm=5 µm$^2$), and the result was designated as the grain boundary density. The average value of nine viewing fields is described in the table. The viewing field to be observed was defined such that the total thickness of the first intermediate layer was to be observed.

Regarding the method of measuring the grain boundaries, first, the viewing field for measurement was defined such that the height was the coating thickness (film thickness) of the Ni layer, and the width was 10 µm irrespective of the film thickness. Then, in a case where the interface between a layer and another layer was undulating, the undulating interface was approximated into a straight line within a range of 10 µm, the intersection point between the grain boundary and an actual interface was extended to touch the aforementioned straight line, and the angle formed thereby was measured.

(Conditions for Preliminary Treatment)
[Cathode Electrolytic Degreasing]
  Degreasing solution: NaOH 60 g/liter
  Degreasing conditions: 2.5 A/dm$^2$, temperature 60° C., degreasing time 60 seconds
[Acid Washing]
  Acid washing solution: 10% sulfuric acid
  Acid washing conditions: immersion for 30 seconds, room temperature
(First Intermediate Layer Plating Conditions)
[Ni Plating] Additive-Free Bath
  Plating solution: Ni(SO$_3$NH$_2$)$_2$.4H$_2$O 500 g/liter, NiCl$_2$ 30 g/liter, H$_3$BO$_3$ 30 g/liter Plating conditions: temperature 50° C.
Thickness: 0.5 μm
(Second Intermediate Layer Plating Conditions)
[Cu Plating]
Plating solution: copper sulfate 180 g/liter, sulfuric acid 80 g/liter
Plating conditions: temperature 40° C.
Thickness: 0.4 μM
(Outermost Layer Sn Plating)
[Sn Plating]
Plating solution: Sn sulfate 80 g/liter, sulfuric acid 80 g/liter
Plating conditions: temperature 13° C.
Thickness: 1.0 μm
In regard to the electrical contact materials of the thus-obtained Examples and Comparative Examples, the following item was tested and evaluated.

(1a) Contact Resistance after Heating

The contact resistance after retention for 100 hours at 180° C. was tested by a four-terminal method. This is an index for heat resistance. The probe had a semispherical tip with a curvature of 5 mm, and the material was silver. The contact load was 2 N, and the flowing current (electrification current) was set to 10 mA. Measurement was made at 10 sites, and the average value thereof was designated as the contact resistance.

When this value was 30 mΩ or larger, the sample was considered to have poor heat resistance and was rated as "D". A sample having a contact resistance value of less than 30 mΩ was considered to have excellent heat resistance, and was rated as "A".

TABLE 1

| | No. | Substrate | Production method | Intermediate layer current density (A/dm$^2$) | Rolling-working ratio (%) before Cu undercoat plating | Rolling-working ratio (%) after Cu undercoat plating | Rolling-working ratio (%) after Sn plating | Heating | Density of grain boundaries in intermediate layer (/μm) | Contact resistance after high-temp leaving (180° C. × 100H) |
|---|---|---|---|---|---|---|---|---|---|---|
| Ex | 1 | FAS680 | Ni intermediate layer plating → Cu undercoat plating → Sn plating → Rolling → Heating | 5 | No rolling | No rolling | 50 | 700° C.-7 sec | 1.9 | A |
| Ex | 2 | FAS680 | Ni intermediate layer plating → Cu undercoat plating → Sn plating → Rolling → Heating | 10 | No rolling | No rolling | 50 | 700° C.-7 sec | 0.7 | A |
| Ex | 3 | FAS680 | Ni intermediate layer plating → Cu undercoat plating → Sn plating → Rolling → Heating | 20 | No rolling | No rolling | 50 | 700° C.-7 sec | 0.5 | A |
| Ex | 4 | FAS680 | Ni intermediate layer plating → Cu undercoat plating → Sn plating → Rolling → Heating | 10 | No rolling | No rolling | 50 | 100° C.-30 min | 1.6 | A |
| Ex | 5 | FAS680 | Ni intermediate layer plating → Cu undercoat plating → Sn plating → Rolling → Heating | 10 | No rolling | No rolling | 50 | 300° C.-7 sec | 1.2 | A |
| Ex | 6 | FAS680 | Ni intermediate layer plating → Cu undercoat plating → Sn plating → Rolling → Heating | 10 | No rolling | No rolling | 50 | 450° C.-7 sec | 1.0 | A |
| Ex | 7 | FAS680 | Ni intermediate layer plating → Rolling → Cu undercoat plating → Sn plating → Heating | 10 | 50 | No rolling | No rolling | 700° C.-7 sec | 1.9 | A |
| Ex | 8 | FAS680 | Ni intermediate layer plating → Cu undercoat plating → Rolling → Sn plating → Heating | 10 | No rolling | 50 | No rolling | 700° C.-7 sec | 1.9 | A |
| Ex | 9 | MSP1 | Ni intermediate layer plating → Cu undercoat plating → Sn plating → Rolling → Heating | 10 | No rolling | No rolling | 50 | 700° C.-7 sec | 2.2 | A |
| Ex | 10 | 7/3 brass | Ni intermediate layer plating → Cu undercoat plating → Sn plating → Rolling → Heating | 10 | No rolling | No rolling | 50 | 700° C.-7 sec | 3.0 | A |
| Ex | 11 | FAS680 | Ni intermediate layer plating → Cu undercoat plating → Sn plating → Heating | 8 | No rolling | No rolling | No rolling | 700° C.-7 sec | 4.0 | A |
| Ex | 12 | FAS680 | Ni intermediate layer plating → Cu undercoat plating → Sn plating → Heating | 10 | No rolling | No rolling | No rolling | 700° C.-7 sec | 3.6 | A |
| Ex | 13 | FAS680 | Ni intermediate layer plating → Cu undercoat plating → Sn plating → Heating | 20 | No rolling | No rolling | No rolling | 700° C.-7 sec | 2.8 | A |
| Ex | 14 | FAS680 | Ni intermediate layer plating → Cu undercoat plating → Sn plating → Heating | 30 | No rolling | No rolling | No rolling | 700° C.-7 sec | 2.0 | A |
| CEx | 1 | FAS680 | Ni intermediate layer plating → Cu undercoat plating → Sn plating → Heating | 5 | No rolling | No rolling | No rolling | 700° C.-7 sec | 4.5 | D |

Note:
Ex means Example
Note:
CEx means Comparative Example

As is apparent from Table 1, Examples 1 to 14 according to the present invention all exhibited satisfactory contact resistance after heating. In Examples 1 to 14, it was confirmed from SIM images as mentioned above that, in all cases, the first intermediate layer was configured as one layer of grains extending from the conductive substrate side to the second intermediate layer side.

Contrary to the above, Comparative Example 1 was an example that was not subjected to area reduction working. Because the current density among the plating conditions for the first intermediate layer was too low, in connection with the grain boundaries of the first intermediate layer, the density of grain boundaries extending in a direction in which the angle formed by the grain boundary in interest and the interface between the conductive substrate and the first intermediate layer was 45° or larger, was too high. As a result, Comparative Example 1 exhibited poor contact resistance after heating.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Conductive substrate
2 First intermediate layer
3 Second intermediate layer
4 Outermost layer
5a Grain boundaries in which an angle formed by the grain boundary in interest and the interface between the conductive substrate 1 and the first intermediate layer 2 is less than 45°
5b Grain boundaries in which an angle formed by the grain boundary in interest and the interface between the conductive substrate 1 and the first intermediate layer 2 is 45° or greater
6 Grains of constituting the first intermediate layer
10 Electrical contact material

The invention claimed is:

1. An electrical contact material having: a conductive substrate comprising copper or a copper alloy; a first intermediate layer provided on the conductive substrate; a second intermediate layer provided on the first intermediate layer; and an outermost layer comprising tin or a tin alloy and provided on the second intermediate layer,
wherein the first intermediate layer is configured as one layer of grains lined-up side by side, said grains constituting the first intermediate layer: and extending from the conductive substrate side to the second intermediate layer side, such that an interface of grain boundaries of the grains constituting the first intermediate layer penetrates an interface between the conductive substrate and the first intermediate layer to an interface between the first intermediate layer and the second intermediate layer, and wherein a grain boundary of the first intermediate layer can be obtained by performing area reduction working,
wherein the first intermediate layer is a single layer configured such that grains are horizontally lined up, and grain boundaries penetrate through the first intermediate layer,
wherein, in the first intermediate layer, the density of grain boundaries extending in a direction in which the angle formed by the grain boundary in interest and the interface between the conductive substrate and the first intermediate layer is 45° or greater, is 4 μm/μm² or less,
wherein the first intermediate layer is subjected to area reduction working, and goes thru recrystallization, wherein said recrystallization is obtained by said area reduction working, wherein said area reduction working is plastic working,
wherein the first intermediate layer comprises any one of nickel, a nickel alloy, cobalt, or a cobalt alloy,
wherein the second intermediate layer is a single and flat copper strike-plating layer that covers the entire surface of the first intermediate layer, and
wherein the first intermediate layer has the grain boundaries.

2. A terminal comprising the electrical contact material as claimed in claim 1.

3. A method of producing the electrical contact material as claimed in claim 1, comprising:
plating the first intermediate layer on the conductive substrate at a current density of 10 A/dm² or higher;
plating the second intermediate layer on the first intermediate layer; and
plating the outermost layer on the second intermediate layer; followed by subjecting the resultant electrical contact material to a heat treatment at 100° C. to 700° C. for 30 minutes to 7 seconds.

4. A method of producing the electrical contact material as claimed in claim 1, comprising:
plating the first intermediate layer on the conductive substrate at a current density of 5 A/dm² or higher;
plating the second intermediate layer on the first intermediate layer; and
plating the outermost layer on the second intermediate layer, followed by performing area reduction working from above the outermost layer, and subjecting the resultant electrical contact material to a heat treatment at 100° C. to 700° C. for 30 minutes to 7 seconds.

5. The method of producing the electrical contact material as claimed in claim 4, wherein the working ratio for the area reduction working is 30% to 70%.

6. A method of producing the electrical contact material as claimed in claim 1, comprising:
plating the first intermediate layer on the conductive substrate at a current density of 5 A/dm² or higher, followed by performing area reduction working from above the first intermediate layer;
plating the second intermediate layer on the first intermediate aver; and
plating the outermost layer on the second intermediate layer, followed by subjecting the resultant electrical contact material to a heat treatment at 100° C. to 700° C. for 30 minutes to 7 seconds.

7. The method of producing the electrical contact material as claimed in claim 6, wherein the working ratio for the area reduction working is 30% to 70%.

8. A method of producing the electrical contact material as claimed in claim 1, comprising:
plating the first intermediate layer on the conductive substrate at a current density of 5 A/dm² or higher;
plating the second intermediate layer on the first intermediate layer, followed by performing area reduction working from above the second intermediate layer; and
plating the outermost layer on the second intermediate layer, followed by subjecting the resultant electrical contact material to a heat treatment at 100° C. to 700° C. for 30 minutes to 7 seconds.

9. The method of producing the electrical contact material as claimed in claim 8, wherein the working ratio for the area reduction working is 30% to 70%.

\* \* \* \* \*